June 3, 1969 R. H. CLAYTON 3,448,210

IMAGE DISSECTOR TUBE AND OPTICAL SYSTEM THEREFOR

Filed May 19, 1966

INVENTOR.
ROBERT H. CLAYTON
BY Edward Goldberg
ATTORNEY

United States Patent Office 3,448,210

Patented June 3, 1969

3,448,210
IMAGE DISSECTOR TUBE AND OPTICAL SYSTEM THEREFOR

Robert H. Clayton, Fort Wayne, Ind., assignor to International Telephone and Telegraph Corporation, Nutley, N.J., a corporation of Maryland Filed May 19, 1966, Ser. No. 551,437
Int. Cl. H04n 5/38, 3/00
U.S. Cl. 178—7.2 6 Claims

ABSTRACT OF THE DISCLOSURE

An image dissector tube includes a horizontal scanning structure with vertical scanning provided externally by movement of a scene relative to a horizontal slit which projects the image onto the face of the tube. A lens arrangement focuses the elemental horizontal line information onto the photocathode while defocusing and spreading the vertical line passing through the slit. This more efficiently distributes the current over the photocathode. A corresponding vertical slit forms the scanning aperture. Use of a light dispersing arrangement provides spectral radiation bands such as various colors in the vertical line, with the aperture plate having a corresponding plurality of smaller aligned vertical slits for scanning the different portions of the spectrum.

This invention relates to image tubes and particularly to a novel optical system and tube structure which permits reduced current loading conditions and increases the light levels at which the tube can operate.

In general an image dissector tube provides an electrical output signal representing light variations of an image projected onto a photocathode on the face of the tube. A corresponding electron image or beam from the photocathode is focused onto the plane of an apertured plate wtih horizontal and vertical deflection coils or plates providing successive line and frame scanning of elemental areas of the electron image across the small aperture in the manner of a television raster. Electrons pass through the aperture into a multiplier structure which provides an amplified output signal. In some applications the vertical deflection or frame scan is not required, since it may be provided by external elements, such as a moving film or other device producing motion of the scene along the vertical axis relative to the tube. In such a case a horizontal field stop or slit may be interposed between the tube face and scene so that only a horizontal line is projected onto the photocathode and only horizontal scanning by the aperture is necessary. However, since the light is continuously concentrated on a small area of the photocathode, there may be fatigue effects and an excessive current loading which severely limits the lifetime capability of the photoemissive surface. Techniques for minimizing this condition have not proven satisfactory or successful.

It is therefore the primary object of the present invention to provide a novel line scanning optical system and structure for an image dissector tube which reduces light intensity and current density on the photocathode while maintaining high resolution. A further object is to provide an improved line scanning system and dissector tube capable of extracting a wide range of output signals from various portions of the spectrum.

These results are accomplished by use of a novel astigmatic lens or light diffracting arrangement, such as a grating or prism, between the field stop slit and image dissector face, which focuses the elemental point to point information along the horizontal line onto the tube while defocusing the narrow vertical dimension of the slit to form a vertical line spread transversely across the height of the tube. A corresponding vertical slit forms the scanning aperture of the image tube. Color information or other spectral response is added to the system by use of a dispersing prism or grating in place of the defocusing portion of the astigmatic lens, with the dissector aperture plate having a corresponding plurality of smaller aligned vertical slits for each region of the spectrum. The details of the invention will be more fully understood and other objects and advantages will become apparent in the following description and accompanying drawings wherein:

Figures 1, 2:
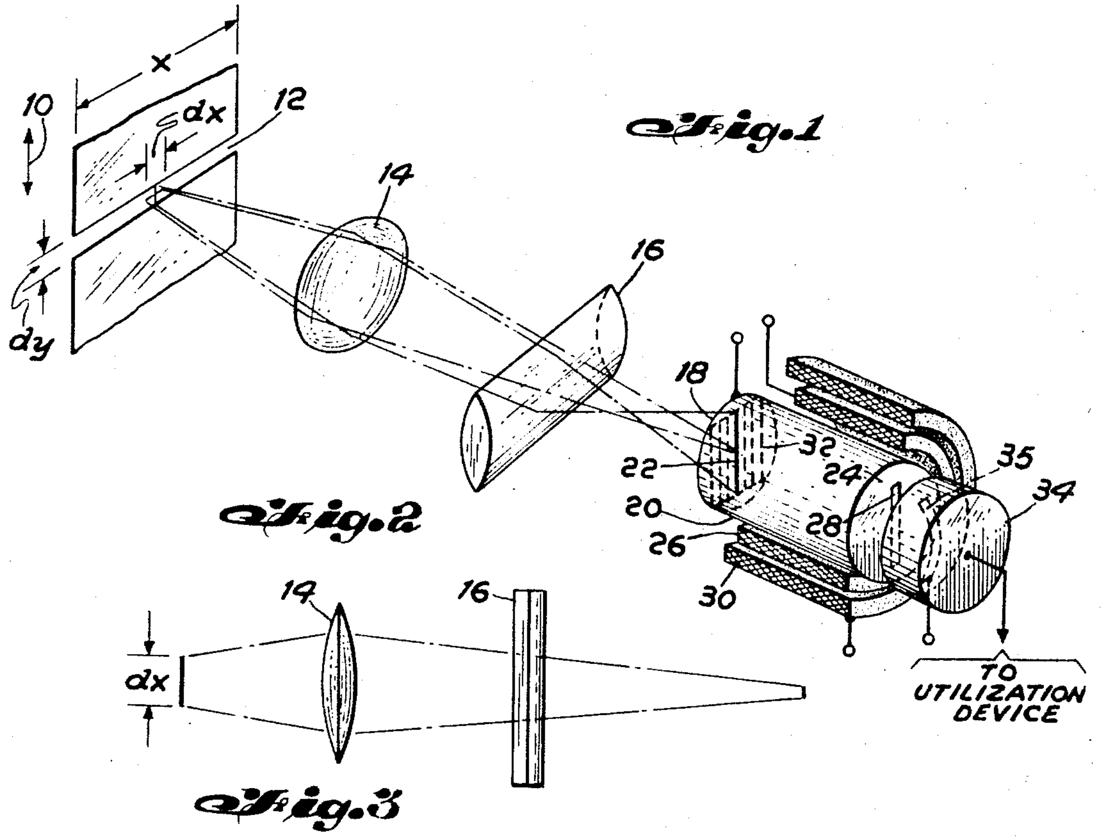
FIG. 1 shows a three dimensional schematic representation of the novel optical system and tube.
FIG. 2 shows a top view of the optical portion of the system.
Figure 3:
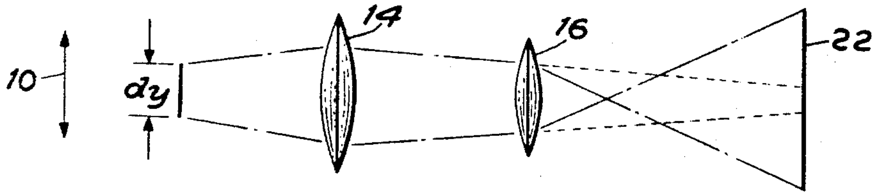
FIG. 3 is a side view of the optical system.

As shown in FIG. 1, an image or scene 10 of varying light intensity is formed at a horizontal slit or field stop 12, having a long dimension X and a short dimension *dy*, positioned in the focal plane of the system. External means such as a moving film, a rotating mirror, the motion of a vehicle carrying the optical system, or the movement of field stop 12 in the vertical direction with respect to the image provides the vertical scanning action perpendicular to the longitudinal axis of the tube across the slit. An elemental horizontal portion *dx* of the image passes through a first spherical convex lens 14 and a second preferably cylindrical convex lens 16 and is focused along the horizontal axis onto the plane of the photocathode 18 on the face of an image dissector tube 20. Such an elemental portion *dx*, along the length of the slit, is shown in FIG. 2 as being sharply focused after passing through both lenses and retaining its narrow horizontal dimensions on the face of the tube. At the same time an elemental segment of the image along the vertical axis, *dy*, shown in FIG. 3, passes through each lens 14, 16 and is defocused by lens 16 and spread across a substantial portion of the height of the photocathode 18 in the form of a vertical line 22. The height will depend upon the cathode width required within the circular perimeter of the tube face. The cylindrical lens 16 provides an astigmatic or over focus effect in the vertical direction to reduce the image light intensity which is otherwise concentrated at the photocathode in a thin line or point having a small vertical dimension. There is no loss in resolution since the field stop 12 provides the limits for the elemental segment in the vertical direction.

Various other combinations of lenses may provide the same astigmatic focus effects. For example, the lens may be formed in one unit with the front half being a convex spherical lens and the back portion being a convex or concave cylindrical lens, or the lens positions may be reversed with the cylinder being first. Two separate cylindrical lenses perpendicular to one another and of unequal strength may likewise be utilized, or various known types of diffraction gratings or prisms may be used in place of the cylindrical lens portion to provide defocusing in the vertical direction.

Light on the photocathode produces a corresponding electron image or beam which is focused onto the plane of an apertured electrode or plate 24 by coils 26 disposed around tube 20. The shape of the aperture 28 corresponds to the elemental thin vertical line portion 22 of the image provided by the optical system and deflection coils 30 provide point to point scanning of the image across the aperture. The coils scan solely in the horizontal direction as indicated by dashed lines 32, since vertical scanning is supplied externally. The aperture 28 is perpendicular to both the system optical axis and longer axis of the field stop aparture. The beam then preferably enters a multiplier structure 34, having a first dynode 35 which is positioned adjacent the aperture and is of substantially the same dimension or slightly larger. Suitable potentials are applied to the various electrodes and coils in a known manner to provide the described operation. The amplified output signal from the multiplier is then fed to any suitable utilization means such as a transmitter or display device. The novel defocusing system thus advantageously utilizes the elimination of vertical scanning to spread the light image and electron beam in the vertical dimension while maintaining good resolution with the field stop and with the lens arrangement providing the sharp focusing in the horizontal direction. This permits a more efficient use of the photocathode, with lower light and current concentrations thereon.

Figure 4:
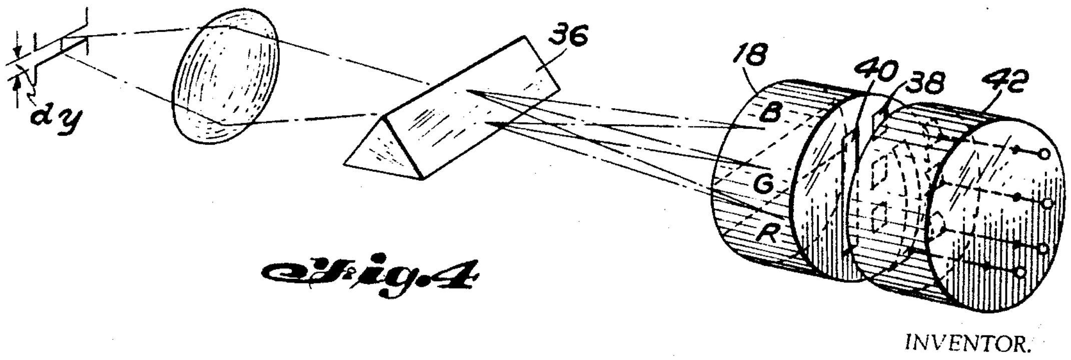
FIG. 4 is another view of the optical system using a color dispersing prism and special apertured image tube.

As shown in FIG. 4, a further variation of the system provides a similar spreading of the beam in the vertical dimension while also extracting desired spectral information such as color, so that the device may be used as a color television camera tube. In this case a color dispersing prism 36 is substituted for the cylindrical lens and the extended vertical line provides a spectrum of various colors. A plurality of corresponding apertures 38 are disposed adjacent respective spectral peak portions along a common vertical line to extract the desired color band such as blue, green and red for example, having simultaneous and separate output signals which may be combined by suitable known circuitry to supply a mixture of color signals compatible with a standard color television display. A snigle lens and single deflection field thus may provide a simple efficient color display system having good position registry and reliable scan tracking, with low cathode loading for bright scenes. Information without such separation of colors for simultaneous black and white displays may be extracted during each horizontal line sweep from an adjacent vertical slit aperture 40 such as in the previous example. A plurality of corresponding dynodes in the electron multiplier 42 or separate multipliers are provided for each aperture. In this case, a suitable time delay circuit may synchronize the outputs from the horizontally displaced apertures. Extended spectral response can similarly be provided for other radiations in the infrared, visible or ultraviolet regions and the photocathode materials may be divided into horizontal segments responsive to such individual radiation frequency bands to provde any desired combination of spectral outputs. In addition, X-ray sensitive electron emissive materials and a special X-ray diffraction system may be employed where such information is desired.

It may thus be seen that the present invention provides a novel simplified image dissector tube and optical system which permits more efficient use of the photocathode materials and provides a signal which may be utilized in various combinations for displaying information of different spectral compositions. While only two embodiments have been illustrated, it is apparent the invention is not limited to the exact forms or uses shown and that many other variations may be made in the particular design and configuration without departing from the scope of the invention as set forth in the appended claims.

What is claimed is:

1. An optical system for an image tube comprising:

an image tube having a radiation responsive electron emissive cathode at one end thereof and an electrode having a plurality of scanning apertures therein at the other end, means projecting a radiation image onto said cathode, said image normally having a relative motion with respect to said tube along a path perpendicular to the longitudinal axis of said tube, means limiting the field of view of said image along said path, said limiting means including a slit having a long dimension perpendicular to said path and axis and a short dimension along said path, means sharply focusing said radiation image from said limiting means in said long dimension and defocusing and spreading said image in said short dimension onto the plane of said cathode, said means defocusing said image including dispersing means separating said image into a plurality of different radiation bands along said path, said cathode producing a corresponding electron image having different bands, means focusing said electron image onto the plane of said scanning apertures, said apertures having a small dimension perpendicular to said path and axis and a long dimension along said path, said apertures being aligned along said path with each aperture positioned to be scanned by one of said bands, means for successively scanning said electron image across said apertures along a line perpendicular to said path and said axis, and output means providing an output signal in accordance with said electron image scanning and entering said apertures.

2. The device of claim 1 wherein said means focusing said radiation image includes a spherical convex lens.

3. The device of claim 1 wherein said output means includes an electron multiplier and a dynode therein adjacent said apertures.

4. The device of claim 3 including a plurality of multiplier dynodes each positioned adjacent a respective said aperture.

5. The device of claim 1 wherein said electron emissive cathode includes a plurality of segments of different spectral responsive material disposed at said one end in the path of respective said radiation bands.

6. The device of claim 1 including a separate elongated aperture positioned adjacent said plurality of aligned apertures to be scanned by a plurality of said bands.

References Cited

UNITED STATES PATENTS

| | | | |
|---|---|---|---|
| 2,315,621 | 4/1943 | Ives | 178—7.2 |
| 2,339,863 | 1/1944 | Knoop | 178—7.2 |
| 3,210,468 | 10/1965 | Trott | 178—7.6 |
| 3,036,152 | 5/1962 | Courtney-Pratt | 178—6.8 |

ROBERT L. GRIFFIN, *Primary Examiner.*

R. L. RICHARDSON, *Assistant Examiner.*